United States Patent
Landry (10) Patent No.: US 8,286,309 B2
(45) Date of Patent: Oct. 16, 2012

(54) MEDIAN BARRIER CABLE TERMINATION

(75) Inventor: Stanley A. Landry, Euless, TX (US)

(73) Assignee: Actuant Corporation, Menomonee Falls, WI (US)

( * ) Notice: Subject to any disclaimer, the term of this patent is extended or adjusted under 35 U.S.C. 154(b) by 543 days.

(21) Appl. No.: 12/482,121

(22) Filed: Jun. 10, 2009

(65) Prior Publication Data
US 2009/0304441 A1 Dec. 10, 2009

Related U.S. Application Data

(60) Provisional application No. 61/060,317, filed on Jun. 10, 2008.

(51) Int. Cl.
*F16G 11/00* (2006.01)
*F16B 7/04* (2006.01)

(52) U.S. Cl. .................. 24/136 B; 24/122.6; 24/136 R; 254/29 A; 29/452; 294/102.1; 403/374.1; 52/223.13

(58) Field of Classification Search ............... 24/135 R, 24/122.6, 115 M, 136 B, 136 R; 52/223.13, 52/146, 711; 403/314, 374.4; 254/29 A; 29/452; 294/102.1
See application file for complete search history.

(56) References Cited

U.S. PATENT DOCUMENTS

| | | | | |
|---|---|---|---|---|
| 1,258,580 A * | 3/1918 | Lassiter | ..................... | 403/374.4 |
| 1,953,290 A * | 4/1934 | Daniel | ........................ | 403/374.4 |
| 2,463,145 A * | 3/1949 | Buchanan | ..................... | 439/784 |
| 2,699,589 A * | 1/1955 | Redell | ........................ | 294/102.1 |
| 3,163,904 A * | 1/1965 | Ziolkowski | .................. | 403/365 |
| 3,361,460 A * | 1/1968 | Jansen | ............................ | 403/16 |
| 3,478,396 A * | 11/1969 | Drouillard | ..................... | 403/371 |
| 3,820,832 A * | 6/1974 | Brandestini et al. | ........ | 24/115 A |
| 3,936,256 A * | 2/1976 | Howlett et al. | ............... | 425/111 |
| 4,053,974 A * | 10/1977 | Howlett et al. | ................. | 29/452 |
| 4,214,728 A * | 7/1980 | Fleischer | ................... | 251/149.2 |
| 4,307,550 A * | 12/1981 | Behar | ........................ | 52/223.13 |
| 4,345,740 A * | 8/1982 | Macchi | ........................ | 254/29 A |
| 4,363,462 A * | 12/1982 | Wlodkowski et al. | ........ | 249/190 |
| 4,509,233 A * | 4/1985 | Shaw | ........................ | 24/136 R |
| 4,707,890 A * | 11/1987 | Savall et al. | ................. | 24/122.6 |
| 4,718,209 A * | 1/1988 | Hansen et al. | ............. | 52/223.13 |
| 4,773,198 A * | 9/1988 | Reinhardt | .................. | 52/223.13 |
| 4,899,499 A | 2/1990 | Hoekstra | | |
| 4,938,094 A * | 7/1990 | Cochard | ........................ | 74/552 |
| 5,015,023 A * | 5/1991 | Hall | ........................ | 294/102.1 |
| 5,018,251 A * | 5/1991 | Brown | ........................ | 24/122.6 |
| 5,079,879 A * | 1/1992 | Rodriguez | ................. | 52/223.13 |
| 5,231,752 A * | 8/1993 | Hereford | ........................ | 29/461 |
| 5,351,366 A * | 10/1994 | Shaw | ........................ | 24/122.6 |
| 5,369,849 A * | 12/1994 | De France | ................. | 24/136 R |

(Continued)

*Primary Examiner* — Robert J Sandy
*Assistant Examiner* — Rowland D Do
(74) *Attorney, Agent, or Firm* — Quarles & Brady LLP (57) ABSTRACT

In one form, the cable termination has a tubular body with an opening into which an end of the median barrier cable is inserted. A wedge gripper includes three sections for gripping the end of the median barrier cable within the tubular body. The wedge gripper has a tapering outer surface that mates with a tapered inner surface of the tubular body and has a toothed inner diameter. A threaded cap is screwed to an end of the tubular body opposite from the cable opening, such that the threaded cap forces the tapering outer surface of the wedge gripper axially against the tapered inner surface of the tubular body to force the toothed inner diameter of the wedge gripper to contract against three lobes of the median barrier cable to grip the median barrier cable.

15 Claims, 6 Drawing Sheets

U.S. PATENT DOCUMENTS

| | | | |
|---|---|---|---|
| 5,594,201 A * | 1/1997 | Reinert, Sr. | 174/37 |
| 5,594,977 A * | 1/1997 | McCallion | 24/136 B |
| 5,653,476 A * | 8/1997 | Su et al. | 285/272.1 |
| 5,755,065 A * | 5/1998 | Sorkin | 52/223.13 |
| 5,802,788 A * | 9/1998 | Ozawa et al. | 52/223.13 |
| 6,017,165 A * | 1/2000 | Sorkin | 403/374.1 |
| 6,027,278 A * | 2/2000 | Sorkin | 403/374.1 |
| 6,234,709 B1 * | 5/2001 | Sorkin | 403/374.1 |
| 6,367,205 B2 * | 4/2002 | Cornett, Sr. | 52/23 |
| 6,684,585 B2 * | 2/2004 | Campbell | 52/223.13 |
| 7,043,801 B2 * | 5/2006 | Toimil | 24/136 R |
| 7,174,685 B2 * | 2/2007 | Hayes | 52/223.6 |
| 7,275,347 B2 * | 10/2007 | Hayes | 52/223.13 |
| 7,424,792 B1 * | 9/2008 | Sorkin | 52/223.13 |
| 7,819,388 B2 * | 10/2010 | McCallion | 254/29 A |
| 7,823,258 B2 * | 11/2010 | Tegg | 24/136 R |
| 8,051,615 B2 * | 11/2011 | Mathews et al. | 52/223.13 |
| 2002/0001504 A1 * | 1/2002 | McCallion | 403/374.3 |
| 2002/0007604 A1 * | 1/2002 | Wallstein | 52/223.13 |
| 2005/0284049 A1 * | 12/2005 | Hayes et al. | 52/223.13 |
| 2008/0302035 A1 * | 12/2008 | Shin | 52/223.13 |

* cited by examiner

MEDIAN BARRIER CABLE TERMINATION

CROSS-REFERENCE TO RELATED APPLICATION

This application claims priority to U.S. provisional application No. 61/060,317, filed Jun. 10, 2008, which is hereby incorporated by reference as if fully set forth herein.

STATEMENT CONCERNING FEDERALLY SPONSORED RESEARCH OR DEVELOPMENT

Not applicable.

FIELD OF THE INVENTION

This invention relates to cable terminations particularly adapted to median barrier cables used on highways to enable securing the end of a median barrier cable to a structure so the cable can be tensioned and used as a traffic barrier.

BACKGROUND OF THE INVENTION

High tension cable barriers are used to guard against traffic accidents caused when a vehicle crosses a median on a highway system. These cable systems, made by several different manufacturers, typically use three-quarter-inch (19 mm) diameter, three-by-seven strand cable ropes, that may or may not be pre-stretched depending on the system, and posts to guide the cables through and maintain cable height. If a crash occurs, the posts are designed to break off and the cables redirect or stop vehicles to significantly reduce crash severity. The cable systems usually include three or four cable tiers and each of the cables has two ends that must be terminated and the cables tensioned, for example, to a tension of several thousand pounds (e.g., 5600 pounds). The termination of the cables must be sufficient to withstand the pretension force on the cable, as well as the forces and vibrations that the cable is subjected to when a vehicle hits it.

Designing these cable terminations has not been without challenges. The cables are a different shape and basic construction than is used in many other cable tensioning applications, such as post-tensioning concrete structures where a standard seven wire post-tension strand is used. Such post-tension strands have a relatively round profile. In high-tension median cable barrier systems, the cable is three twisted strands, each made of seven strands twisted together, and the three, seven strand cables are twisted together to make a cable rope that has a three-lobed profile.

Figure 1:
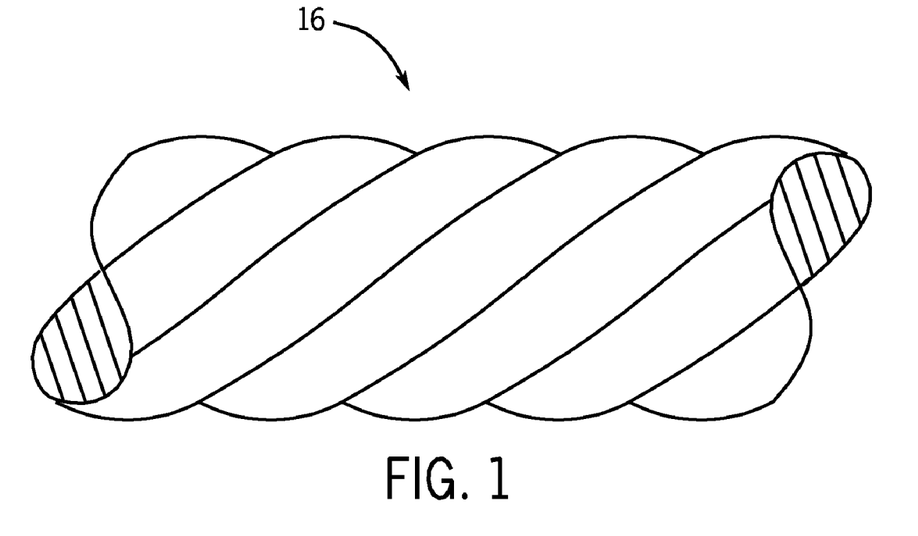
FIG. 1 is a simplified side plan view of typical median barrier cable.
Figure 2:
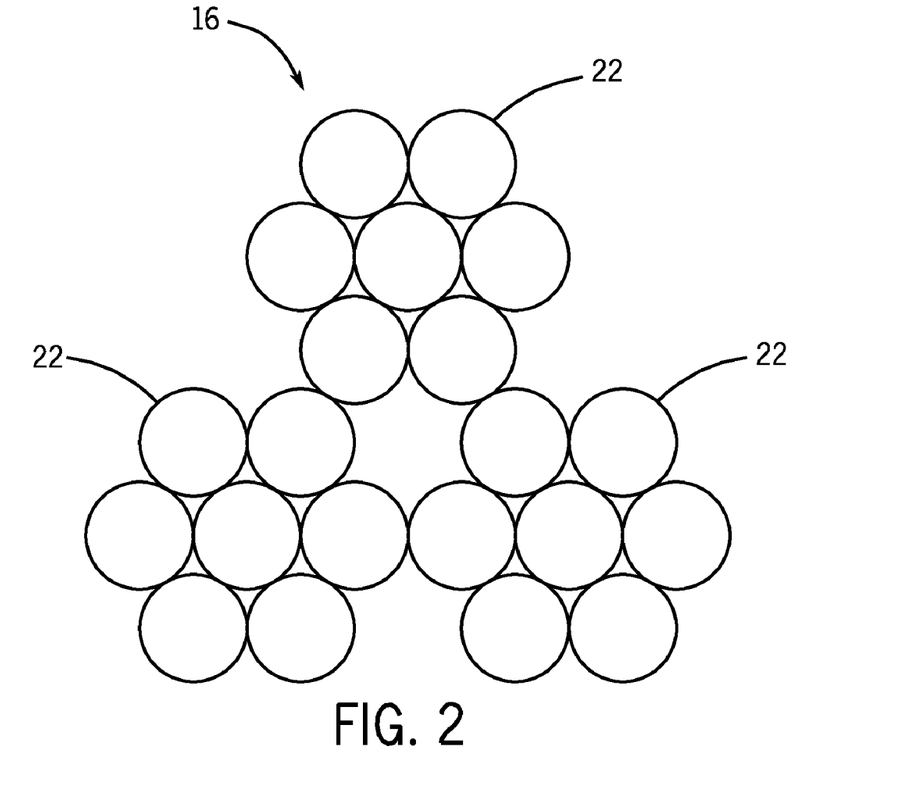
FIG. 2 is an end plan view of the median barrier cable of FIG. 1.

The three-lobed rope is illustrated in FIGS. 1 and 2. It is specified as a 19-3×7 wire rope and conforms to the requirements of AASHTO M30 Type 1 Class A coding 19 mm wire rope. The rope, with connecting hardware attached, is specified to develop 110 kN strength of a single cable. It is particularly specified to be used as the rail element in cable guard rails on highways, particularly in the median, to prevent vehicles from crossing the median into the oncoming lane of traffic.

A cable wedge fastener is used to terminate the end of the wire rope so that it can be connected to either a turnbuckle for tensioning the wire rope or to another tension-related device to adjust or maintain the tension in the wire rope. Prior wedges for fastening such wire ropes typically had a seven-degree taper on the wedges and the wedges were configured in a manner such that pull-out of the cable ends from the termination was more likely than presently acceptable. The present invention provides an improvement to such prior wedge-style terminations.

Another type of cable termination is disclosed in U.S. Pat. No. 4,899,499, the disclosure of which is hereby incorporated by reference. The anchor disclosed has a body with a wedge shaped (conical) internal bore surface, a three section cable gripper with a wedge shaped (conical) external surface received in the bore, a cable gripped by the grippers and extending from one end of the body, a threaded cap at the end of the body opposite from the cable, a threaded stem extending from the cap outside of the body at the end opposite from the cable and the stem having a head that is captured against the interior facing surface of the cap. The stem is threaded into an insert that is embedded in a concrete structure or otherwise affixed to a relatively immovable structure. The termination disclosed in the references appears to be particularly adapted to grip post-tensioning strand of the type described above, being made of seven twisted wire bundles, with one of the bundles in the middle and the other six bundles twisted around the middle bundle.

Another problem with cable terminations of this type is corrosion inside the anchor. For example, corrosion can occur between the grippers in the body, between the cable and the grippers, and between the cap and the stem, which can ultimately reduce the tension in the cable and the grip of the termination on the cable.

SUMMARY OF THE INVENTION

In one aspect, a cable termination is described for use with a median barrier cable made of three bundles of twisted wires, the three bundles being twisted together to form a wire rope having three lobes, each lobe being formed by one of the bundles. The cable termination comprises a tubular body with a cable opening in at least one end into which an end of the median barrier cable can be inserted. A wedge gripper has three sections for gripping the end of the median barrier cable within the tubular body. The wedge gripper further has a tapering outer surface that mates with a tapered inner surface of the tubular body, and has a toothed inner diameter. A threaded cap is screwed to an end of the tubular body opposite from the cable opening. Screwing the threaded cap into the body forces the tapering outer surface of the wedge gripper axially against the tapered inner surface of the tubular body to force the toothed inner diameter of the wedge gripper to contract against the three lobes of the median barrier cable so as to grip the median barrier cable in the body.

In another aspect, a method of terminating a median barrier cable made of three bundles of twisted wires, the three bundles being twisted together to form a wire rope having three lobes is described. The method comprises providing a tubular body with a cable opening in at least one end and a tapered inner surface, a wedge gripper having a plurality of sections, a tapering outer surface, and a toothed inner diameter, and a threaded cap; inserting the median barrier cable into the cable opening in the body; mating the tapering outer surface of the wedge gripper with the tapered inner surface of the tubular body; and screwing the threaded cap to an end of the tubular body opposite from the cable opening to force the tapering outer surface of the wedge gripper against the tapered inner surface of the tubular body to force the toothed inner diameter of the wedge gripper to contract against the median barrier cable so as to grip the median barrier cable in the body.

In a further aspect, a cable termination is described comprising a tubular body having a tapered inner surface and an opening at one end into which an end of a cable can be inserted, a wedge gripper having at least two sections positioned within the tubular body, each of the at least two sections includes a tapering outer surface that mates with the tapered inner surface of the tubular body and a toothed inner diameter, and a threaded cap screwed to an end of the tubular body opposite from the opening and engaged with the wedge gripper to retain the wedge gripper within the tubular body and maintain engagement of the toothed inner diameter of the wedge gripper with the cable.

These and still other aspects will be apparent from the description that follows. In the detailed description, a preferred example embodiment of the invention will be described with reference to the accompanying drawings. This embodiment does not represent the full scope of the invention; rather the invention may be employed in other embodiments. Reference should therefore be made to the claims herein for interpreting the breadth of the invention.

DETAILED DESCRIPTION OF THE PREFERRED EMBODIMENT

Figures 3, 6:
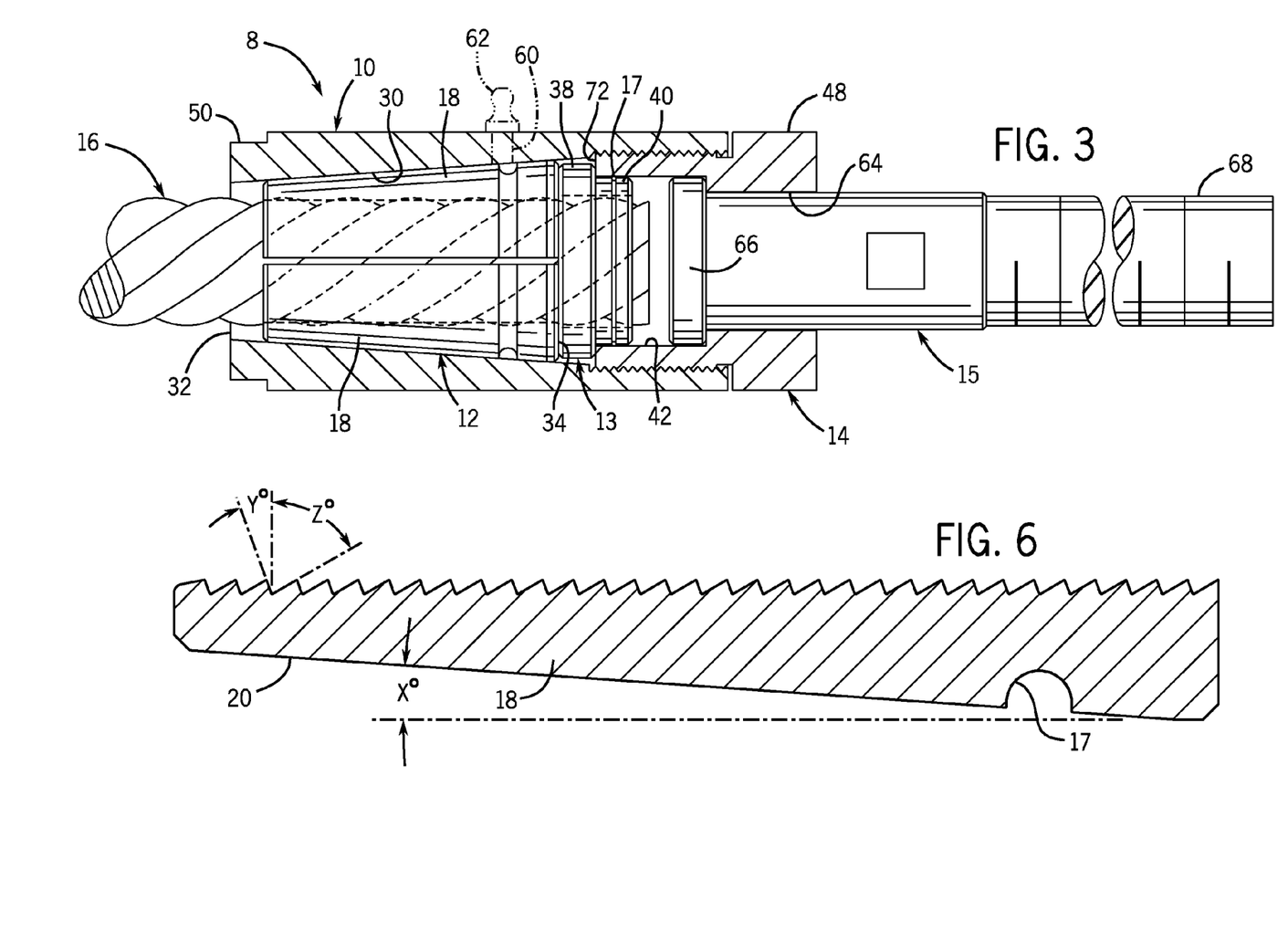
FIG. 3 is a cross-sectional assembly view in schematic form of a termination of the invention.
FIG. 6 is a detail view of the angle on the wedge and showing the angles of the teeth on the inside of the wedge.

Referring to FIG. 3, a termination 8 of the invention has a body 10 containing a wedge gripper 12 having a larger diameter end 34 abutting a washer 13 that is pressed against the wedge gripper 12 by a threaded cap 14 that is screwed into the body 10. A stem 15 extends through a hole 64 in the cap 14 and is trapped inside the body 10 and a median barrier cable 16 is trapped by jaw sections 18 of the wedge gripper 12.

Figure 4:
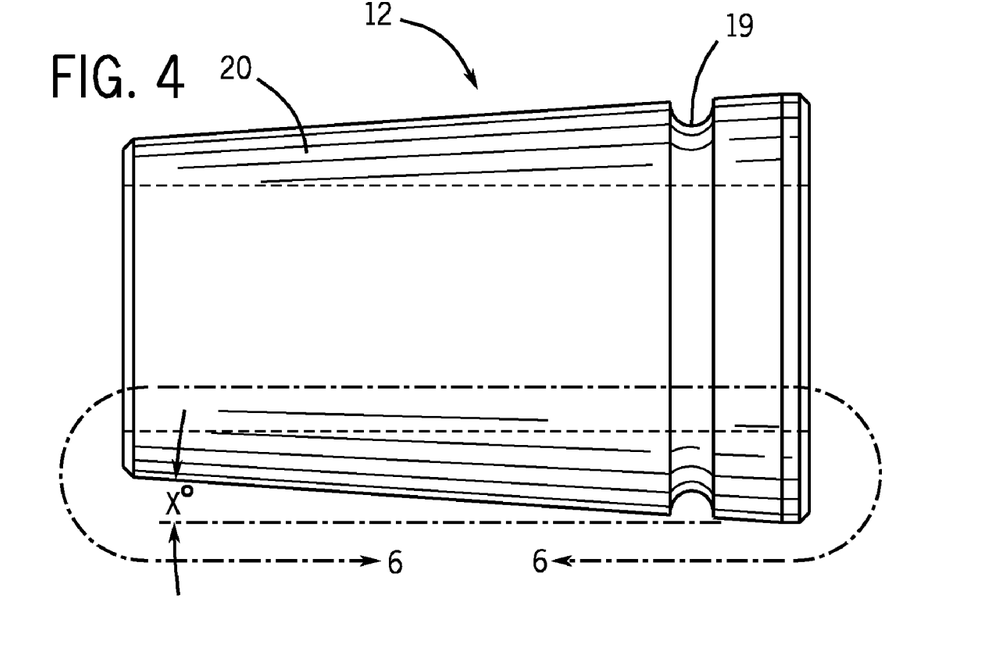
FIG. 4 is a side plan view of the wedge in FIG. 3 prior to longitudinal separation into three sections.
Figure 5:
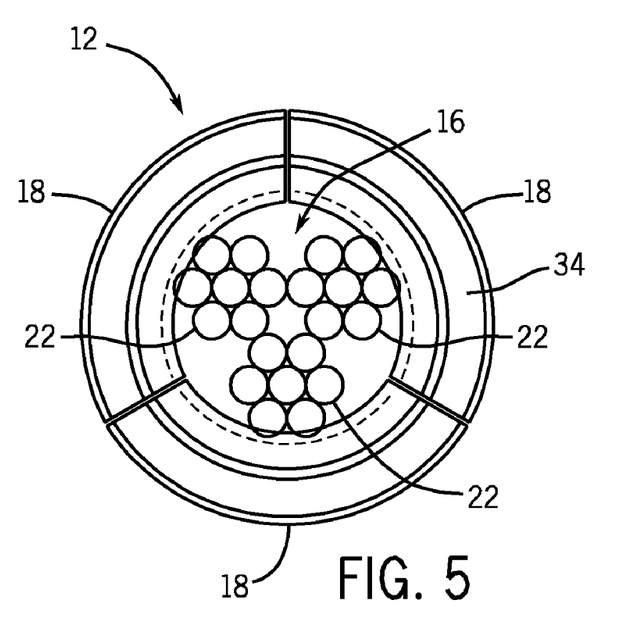
FIG. 5 is a simplified end plan view of the wedge of FIG. 4 after separation and with a cable contained in it.

Referring to FIGS. 4, 5, and 6, the wedge gripper 12 has an outer surface 20 that tapers and, in the example embodiment, is formed by machining a piece of suitable metal, for example tool steel or other steel, to that shape and then drilling a hole in it and tapping the hole so that the hole has teeth, as shown in FIG. 6, that serve to grip the cable 16. The cable 16 has a nominal effective diameter of 19 mm (¾ inches), even though the cross-sectional profile of it as shown in FIG. 2 is not round. However, the circle defined by the outer points of the lobes 22 of the cable 16 define a circle that would be approximately three-quarter inch or 19 mm in diameter. Preferably, the major diameter of the teeth formed on the inside diameter of the wedge gripper 12 is less than the nominal effective diameter of the cable. For example, for the median barrier cable that is ¾ inches nominal effective diameter, the hole in the wedge gripper 12 is preferably smaller than the effective diameter of three-quarters of an inch. In particular, the major diameter, i.e. to the bottoms of the valleys between the teeth, is less than three-quarter inch (19 mm). For example, for a three-quarter inch wire rope, the major diameter could be 0.716 inches. This would be the result of using a tap of 0.716-26 to form the teeth, which means 0.716 inches major diameter and 26 threads, or teeth, per inch.

In addition, when assembling the cable 16 to the termination 8, the lobes 22 should be oriented relative to the sections 18 as shown in FIG. 5, with each lobe roughly centered on each section 18 at the larger diameter end 34 of the wedge gripper 12. Since the lobes 22 are twisted along their length, the position of the lobes relative to the sections 18 will change along the length of the wedge gripper 12, but at the large diameter end they should be centered relative to the sections 18 as shown in FIG. 5.

In addition, as shown in FIGS. 4 and 6, the taper angle X° of the wedge gripper 12 is preferably four degrees. This differs from typical taper angles for the wedges in common post-tension terminations. In addition, the tooth angles of the teeth on the inner diameter of the wedge sections 18, that is, angles Y° and Z°, may be 60 and 20 degrees, respectively, as shown in FIG. 6, with the 20-degree angle resisting pull-out of the cable, to try to maximize the pull-out forces necessary to dislodge the cable from the termination 8.

The body 10 has a mating frusto-conical surface 30 of the same angle as the frusto-conical outer surface 20 of the wedge gripper 12, in the preferred embodiment, four degrees. Thus, as the wedge gripper 12 is moved leftwardly as viewed in FIG. 3, in other words toward the cable opening 32 or smaller diameter end of the surface 30, the wedge sections 18 collapse inwardly on the cable 16 to bite the teeth of the wedge gripper 12 into the outer surface of the cable 16 and thereby hold the cable 16 firmly to the termination 8.

The seating force to bite the teeth of the wedge gripper 12 into the cable 16 can be very large, often requiring that the wedges be "seated" by applying a hydraulic load to the cable to apply the seating force. This operation is most commonly done with a post-tensioning jack system, which includes a jack, hose, gauge, and pump.

Figure 10:
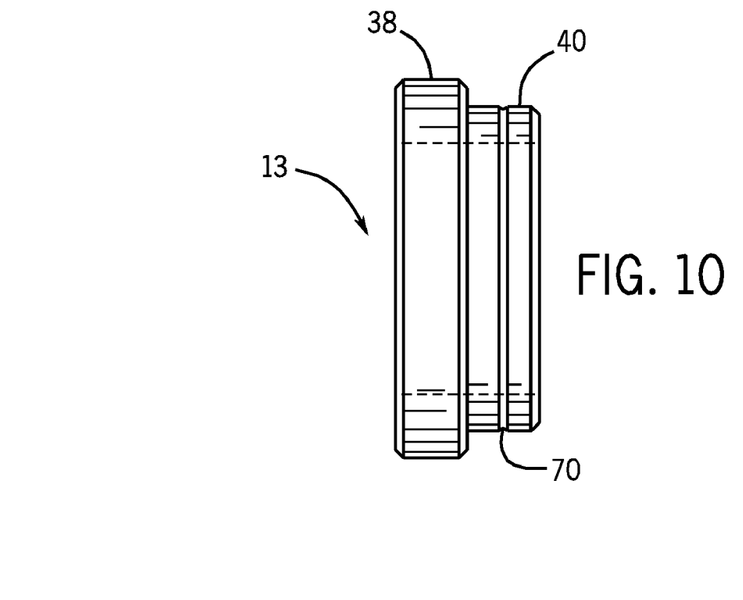
FIG. 10 is a side plan view of the washer used in FIG. 3.

In the present invention, to minimize or avoid the use of such hydraulic equipment, the wedge gripper 12 may be at least partially seated using a threaded connection. The washer 13 (shown in FIGS. 3 and 10) resides generally between the larger diameter end 34 of the wedge gripper 12 and the end 72 of the cap 14. The washer 13 has an enlarged head 38 that resides in this position, and a reduced diameter shank 40 that extends into a bore 42 in the cap 14. An O-ring 17 in a groove 70 (best shown in FIGS. 3 and 10) of the shank 40 loosely secures the washer 13 inside the bore 42. The washer 13 can rotate relative to the cap 14 to reduce the transmission of rotary force from the cap 14 to the wedge gripper 12 as the cap 14 is rotated.

Figure 7:
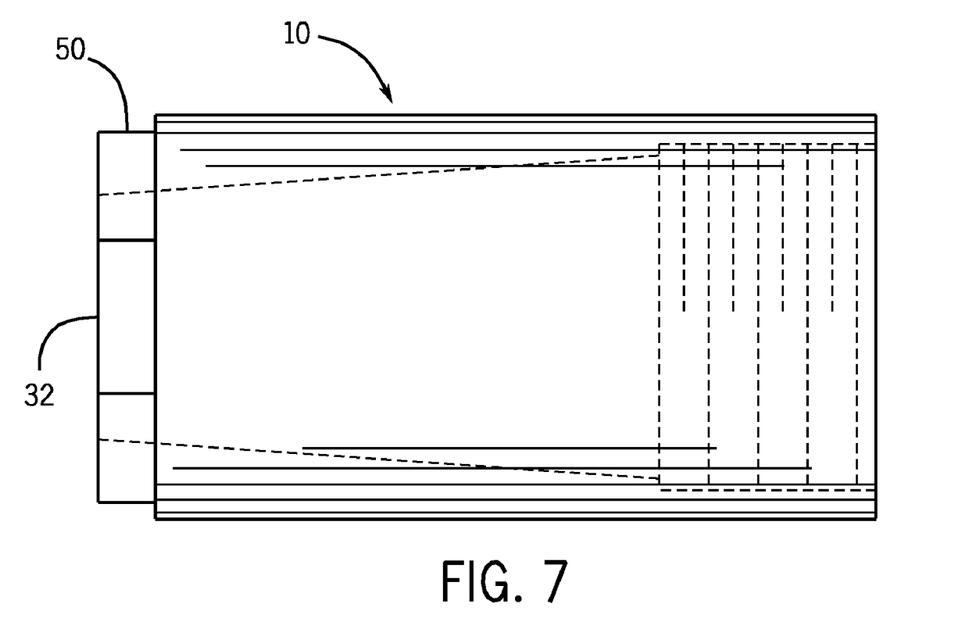
FIG. 7 is a side plan view of the body of the termination of FIG. 3, it being understood that the teeth on the inner surface continue for substantially the whole length of the gripper.
Figure 8:
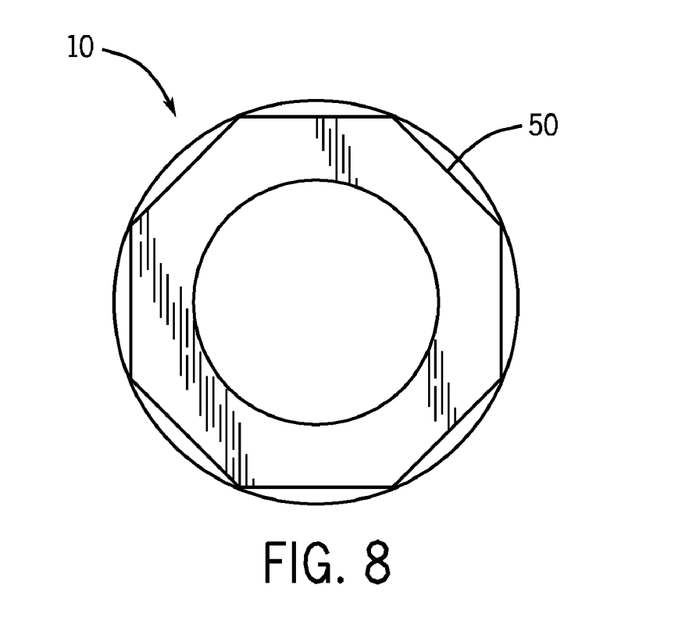
FIG. 8 is an end plan view of the body.
Figure 11:
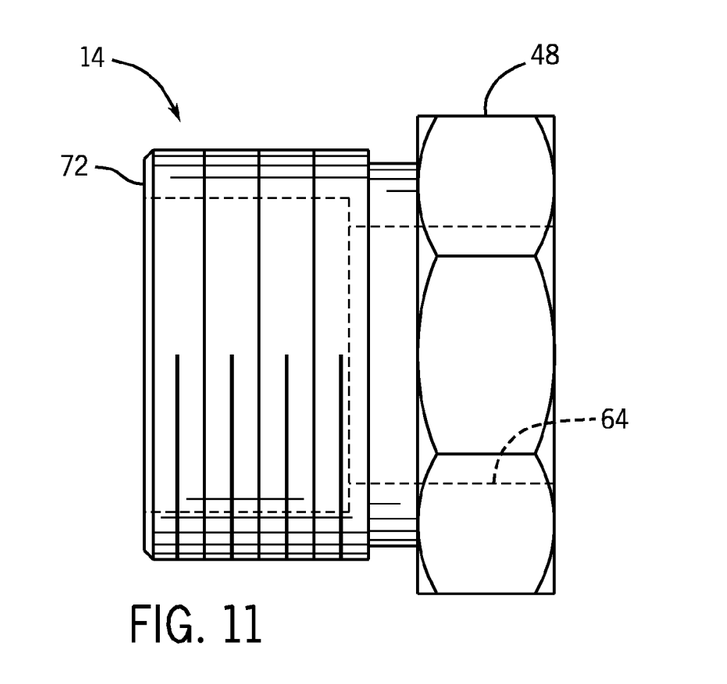
FIG. 11 is a side plan view of the cap used in FIG. 3.
Figure 12:
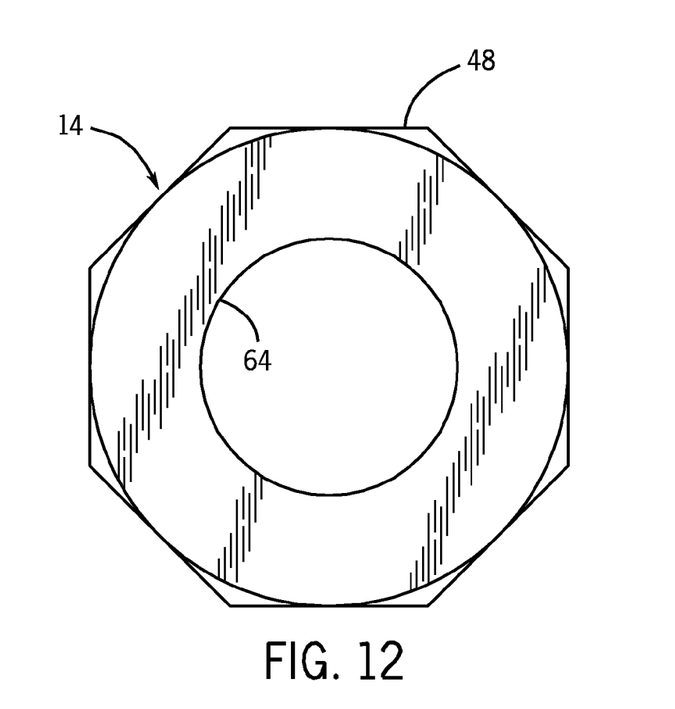
FIG. 12 is an end plan view of the cap.

The cap 14 is threaded into the end of the body 10 to bear against the washer 13 and the washer 13 to bear against the larger diameter end 34 of the wedge gripper 12 to force the wedge gripper 12 axially against the tapered surface 30. In addition, the cap 14 mechanically retains the wedge gripper 12 and the washer 13 within the body 10, thereby inhibiting vibrations of the cable 16, such as those encountered during a collision, from substantially loosening the engagement of the wedge gripper 12 with the cable 16. The cap 14 (also shown in FIGS. 11 and 12) has a hex 48 in conventional fashion, and the body 10 (also shown in FIGS. 7 and 8) is also formed with a hex 50 at its cable end that can be gripped by a wrench or other tool. Thus, a significant torque can be placed on the cap 14 while holding the body 10 with a wrench to force the wedge gripper 12 against the surface 30 and collapse the inside diameter of the wedge gripper 12 against the cable 16.

Figure 9:
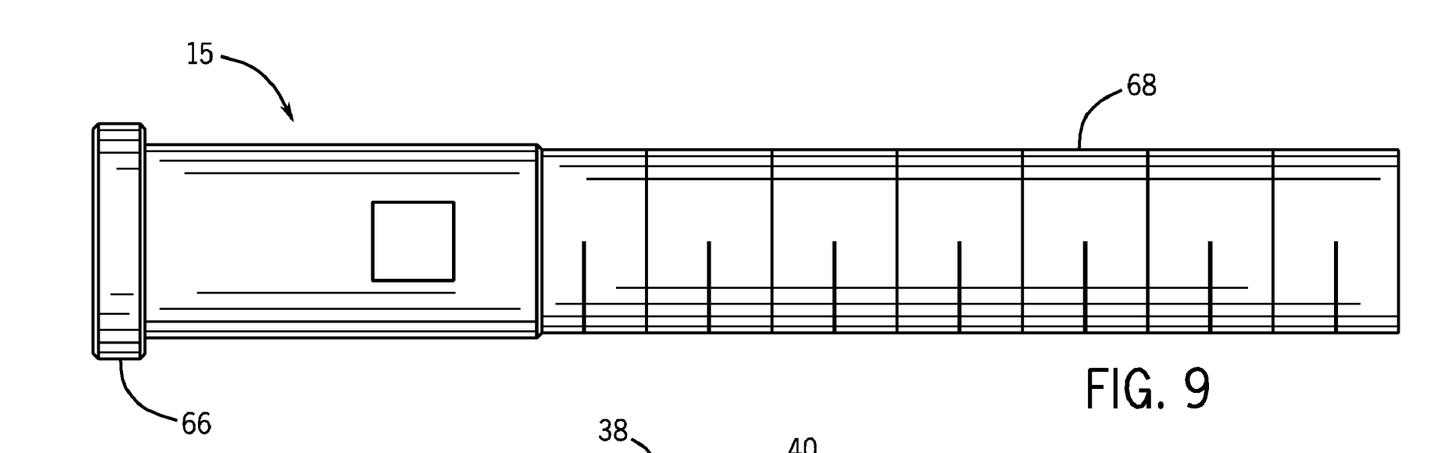
FIG. 9 is a side plan view of the stem in FIG. 3.

A threaded stem 15 (shown in FIGS. 3 and 9) extends through a hole 64 in the cap 14 and has an enlarged head 66 trapped in the body 10 by the cap 14. The head 66 may be flat as shown, or may have a ball surface that mates against a similar socket-shaped surface of the cap 14 so that the stem 15 can be articulated relative to the cap 14. The stem 15 has threads 68 to attach the termination 8 to a suitable foundation, turnbuckle, or other structure so that a high tension can be induced in the cable 16.

The wedge gripper 12 is initially made in one piece, by forming the tapered outer side and drilling and tapping the inside diameter, and then it is cut into the three sections 18. There must be enough space between the sections 18 so that the wedge gripper 12 can collapse to the full extent onto the cable 16. Also, when fully compressed against the cable 16, the wedge gripper 12 preferably does not extend beyond the left end of the body 10, as viewed in FIG. 3. A groove 19 is formed in the outer surface 20 so an o-ring (not shown) can be used to hold the wedge sections 18 together when the wedge is placed around a cable, prior to inserting the wedge into the body.

As best shown in FIG. 3, the wedge gripper 12 is preferably of sufficient length such that the teeth of the each of the three sections 18 each grip at least two of the lobes 22 of the cable 16 when the cap 14 is tightened to the body 10. For example, a wedge gripper 12 having a length of approximately two and one-half inches is sufficient to engage multiple lobes 22 of cable 16 having a nominal effective diameter of approximately ¾ inches.

In addition, an opening 60 can be formed in the side of the body 10, and if desired, the opening 60 can be tapped and a zerc fitting 62 installed. The opening 60 and if a zerc fitting 62 is used, are used for introducing a potting compound into the interior of the body 10, and particularly into the interior of the wedge gripper 12 to fill the spaces between the lobes 22 of the cable 16 and the inside diameter of the wedge gripper 12. It would also fill all void spaces inside the body 10, including any spaces between the lobes 22 and spaces between the individual wires of the lobes 22 to fix the connection between the cable 16 and the body 10. The potting compound may be, for example, an epoxy resin that bonds well to metal surfaces and hardens solid. The potting compound would help hold the barrier cable 16 inside the body 10, help prevent it from flattening into the voids which would otherwise be there, and also reduce corrosion inside the body 10. It could be introduced either directly through the opening 60, or through a zerc or other suitable fitting screwed into the opening 60.

Preferred embodiments of the invention have been described in considerable detail. Many modifications and variations to the preferred embodiments described will be apparent to a person of ordinary skill in the art. Therefore, the invention should not be limited to the embodiments described but by the claims which follow.

I claim:

1. A cable termination for a median barrier cable made of three bundles of twisted wires, the three bundles being twisted together to form a wire rope having three lobes, each lobe being formed by one of the bundles, the cable termination comprising a tubular body with a cable opening in at least one end into which an end of the median barrier cable can be inserted, a wedge gripper having three sections for gripping the end of the median barrier cable within the tubular body, the wedge gripper having a tapering outer surface that mates with a tapered inner surface of the tubular body and having a toothed inner diameter, and a threaded cap having external threads screwed to internal threads in an end of the tubular body opposite from the cable opening, and a washer between the threaded cap and an end of the wedge gripper against which the threaded cap bears to exert an axial force on the end of the wedge gripper, wherein the washer has a shank that engages a bore of the threaded cap and the washer is rotatable relative to the threaded cap as the threaded cap is turned relative to the body, and wherein screwing the threaded cap into the body forces the tapering outer surface of the wedge gripper axially against the tapered inner surface of the tubular body to force the toothed inner diameter of the wedge gripper to contract against the three lobes of the median barrier cable so as to grip the median barrier cable in the body.

2. The cable termination for a median barrier cable as claimed in claim 1, wherein the threaded cap has a stud extending from it.

3. The cable termination for a median barrier cable as claimed in claim 1, wherein the body is at least partially filled with a potting compound.

4. The cable termination for a median barrier cable as claimed in claim 3, wherein the potting compound is an epoxy.

5. The cable termination for a median barrier cable as claimed in claim 1, wherein an inside diameter of the wedge gripper is less than three-quarters of an inch.

6. The cable termination for a median barrier cable as claimed in claim 1, wherein the tapering outer surface of the wedge gripper is tapered at an angle of four degrees.

7. The cable termination for a median barrier cable as claimed in claim 1, wherein an O-ring retains the washer in the bore of the threaded cap.

8. The cable termination for a median barrier cable as claimed in claim 1, wherein a hex is formed on the body for turning the body relative to the threaded cap.

9. The cable termination for a median barrier cable as claimed in claim 1, wherein each of the three sections of the wedge gripper are configured to contract against at least any two of the three lobes of the median barrier cable.

10. The cable termination for a median barrier cable as claimed in claim 1, wherein a longitudinal length of the wedge gripper is approximately two and one-half inches.

11. A method of terminating a median barrier cable made of three bundles of twisted wires, the three bundles being twisted together to form a wire rope having three lobes, comprising:

providing a tubular body with a cable opening in at least one end and a tapered inner surface, a wedge gripper having a plurality of sections, a tapering outer surface, and a toothed inner diameter, a threaded cap having a bore, and a washer having a shank;

inserting the median barrier cable into the cable opening in the body;

mating the tapering outer surface of the wedge gripper with the tapered inner surface of the tubular body;

positioning the washer between the threaded cap and an end of the wedge gripper against which the threaded cap bears such that the shank of the washer engages the bore of the threaded cap; and screwing the threaded cap to an end of the tubular body opposite from the cable opening to urge the washer to exert an axial force on the end of the wedge gripper to force the tapering outer surface of the wedge gripper against the tapered inner surface of the tubular body to force the toothed inner diameter of the wedge gripper to contract against the median barrier cable so as to grip the median barrier cable in the body.

12. The method of terminating a median barrier cable of claim 11, further comprising at least partially filling the body with a potting compound.

13. The method of terminating a median barrier cable of claim 11, wherein screwing the threaded cap to the end of the tubular body comprises:
   engaging a hex formed on the body; and
   turning the threaded cap relative to the body.

14. A cable termination, comprising:
   a tubular body having a tapered inner surface and an opening at one end into which an end of a cable can be inserted;
   a wedge gripper having at least two sections positioned within the tubular body, each of the at least two sections includes a tapering outer surface that mates with the tapered inner surface of the tubular body and a toothed inner diameter;
   a threaded cap screwed to an end of the tubular body opposite from the opening and engaged with the wedge gripper to retain the wedge gripper within the tubular body and maintain engagement of the toothed inner diameter of the wedge gripper with the cable;
   a washer positioned between the threaded cap and an end of the wedge gripper against which the threaded cap bears to exert an axial force on the end of the wedge gripper; and
   wherein the washer has a shank that engages a bore of the threaded cap.

15. The cable termination of claim 14, wherein:
   the tubular body includes internal threads; and
   the threaded cap includes external threads that mate with the internal threads when the threaded cap is screwed to the end of the tubular body.

* * * * *